United States Patent [19]
Dion

[11] Patent Number: 5,307,222
[45] Date of Patent: Apr. 26, 1994

[54] AIR FILTER AND CIRCULATION SYSTEM FOR A HARD DISK DRIVE

[75] Inventor: F. Eugene Dion, Longmont, Colo.

[73] Assignee: Maxtor Corporation, San Jose, Calif.

[21] Appl. No.: 975,646

[22] Filed: Nov. 13, 1992

[51] Int. Cl.⁵ .............................................. G11B 17/02
[52] U.S. Cl. .................................................. 360/97.02
[58] Field of Search ................ 360/97.02, 97.03, 97.04

[56] References Cited
U.S. PATENT DOCUMENTS 4,363,057 12/1982 Siverling et al. .................. 360/97.03
4,863,499 9/1989 Osendorf ........................... 360/97.02

Primary Examiner—Robert S. Tupper
Attorney, Agent, or Firm—Blakely, Sokoloff, Taylor & Zafman

[57] ABSTRACT

A filter system for a hard disk drive which has a venturi that is actuated by rotation of the magnetic disk and which pumps internal air through a recirculation filter located within the disk drive. The drive unit also has a diffusion tube, desiccant and breather filter coupled to the ambient by a breather port in the housing of the disk drive.

3 Claims, 2 Drawing Sheets

AIR FILTER AND CIRCULATION SYSTEM FOR A HARD DISK DRIVE

BACKGROUND OF THE INVENTION

1. Field of the Invention

The present invention relates to a hard disk drive assembly.

2. Description of Related Art

Hard disk drives contain magnetic heads which magnetize and sense the magnetic fields of adjacent magnetic disks. The introduction of contaminants such as dust or water into the drive unit may induce errors during the operation of the disk. It would be desirable to absolutely seal the disk drive to prevent foreign matter from enter the inner cavity of the drive unit. Unfortunately, defects occur in the manufacturing or subsequent use of the disk drive, such that a perfect seal is not always attained. For this reason most commercially available hard disk drives contain filter systems that remove contaminants that enter the drive unit. Such filter systems typically have a dedicated opening or openings through which ambient air may flow into the disk drive. A filter(s) is typically placed in fluid communication with the opening to capture any contaminants that may enter the drive.

A filter system for a hard disk drive must be capable of removing both dust and water particles that may enter the drive unit. Additionally, it is also desirable to have a second filter system that removes any contaminants that were not captured by the primary filters, trapped in the drive during assembly, or that enter the cavity through a secondary opening. Such a filter system must also compensate for variances in the ambient pressure. For example, using the disk drive at elevation may reduce the internal pressure within the drive unit. Subsequent use at lower altitude may cause the higher pressure ambient to force air into the disk drive. It would therefore be desirable to have a drive unit that has an efficient filter system and which does not allow air to enter the inner cavity of the disk drive when the unit is used in environments having different air pressures.

SUMMARY OF THE INVENTION

The present invention is hard disk drive which has a number of filter systems which prevent contaminants from causing errors in the read/write operations of the drive. The disk drive has a single breather port that provides fluid communication between the ambient and a diffusion tube that is formed into the housing of the drive unit. The diffusion tube is coupled to a desiccant pocket which contains a breather filter and a water absorbing material such as a desiccant. The desiccant pocket is connected to a venturi portion of the inner cavity of the disk drive.

The venturi portion is coupled to a lower recirculation chamber which is separated from an upper recirculation chamber by a recirculation filter. The disk drive also has a recirculation slot which provides fluid communication between an inner cavity of the disk drive and the upper recirculation chamber. Rotation of the magnetic disk pushes air from the inner cavity into the upper recirculation chamber. The disk rotation across the venturi portion also creates a low pressure in the lower recirculation chamber, such that air flows across the recirculation filter from the upper recirculation chamber to the lower recirculation chamber.

The recirculation chambers, venturi portion and rotating disk all create an internal pumping system which recirculates the internal air of the disk through the recirculation filter to capture any contaminants within the disk drive. The positive pumping system provides an efficient method of removing contaminants within the drive unit. The rotating disk and venturi also create a pressure in the inner cavity which is typically higher than the ambient pressure, so that air does not enter the disk drive through secondary openings that may be formed in the housing during the manufacturing or subsequent use of the drive unit.

The desiccant and breather filter prevent water and other foreign matter from entering the inner cavity through the breather port. The diffusion tube provides an air capacitor which compensates for changing ambient pressure. In particular, the diffusion tube is constructed so that air is not pumped into the inner cavity when the ambient pressure is higher than the internal pressure of the disk drive.

Therefore it is an object of the present invention to provide a filter system for a hard disk drive which prevents contaminants from entering the drive unit and provides an efficient means for recirculating the air within the drive.

It is also an object of the present invention to provide a filter system for a disk drive which can efficiently operate at various ambient pressures.

BRIEF DESCRIPTION OF THE DRAWINGS

The objects and advantages of the present invention will become more readily apparent to those ordinarily skilled in the art after reviewing the following detailed description and accompanying drawings, wherein.

DESCRIPTION OF THE INVENTION

Figure 2:
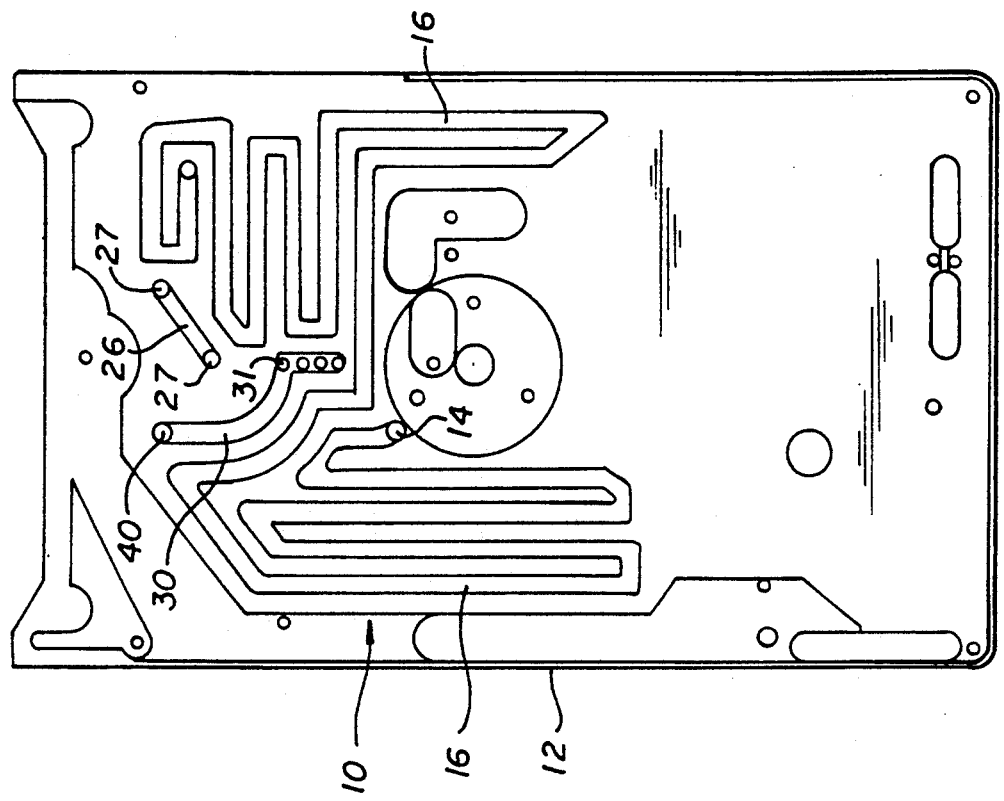
FIG. 2 is a bottom view of the baseplate of FIG. 1.
Figure 1:
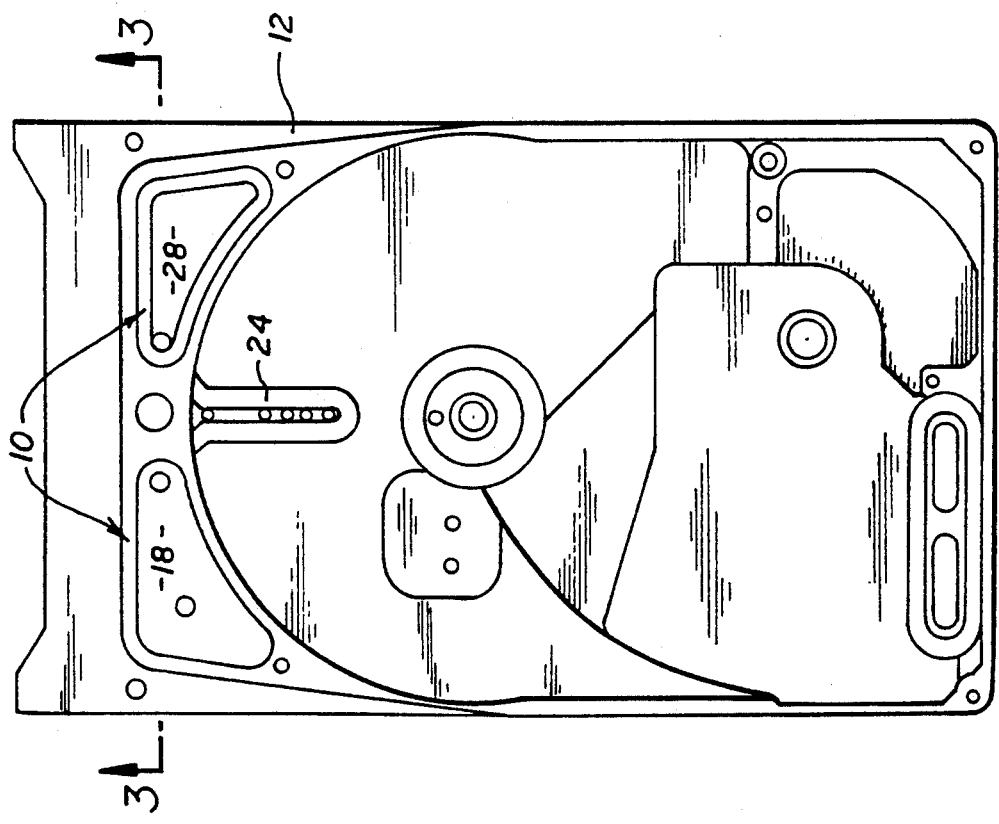
FIG. 1 is a top view of a baseplate of a hard disk drive of the present invention.

Referring to the drawings more particularly by reference numbers, FIGS. 1 and 2 show a filter system 10 for a hard disk drive. The disk drive preferably has a female connector that can be plugged into a mating male connector within a computer and has dimensions of approximately 85.6 millimeters by 54.0 millimeters by 10.5 millimeters. The disk drive has a baseplate 12 that contains a breather port 14 which provides fluid communication between the ambient and a diffusion tube 16. The breather port 14 is the only opening into the disk drive. The diffusion tube 16 is typically defined by a plastic film with a pressure sensitive adhesive layer which covers channels formed in the baseplate 12. The diffusion tube 16 is connected to a desiccant pocket 18 formed in the baseplate 12 through opening 19.

Figure 3:
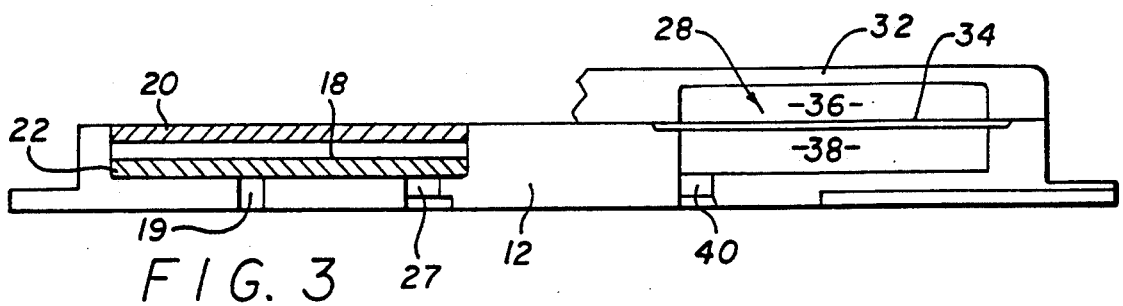
FIG. 3 is a cross-sectional view of the baseplate showing a desiccant and breather filter within a desiccant pocket.

As shown in FIG. 3, the desiccant pocket 18 typically contains a liquid absorbing member 20 and a breather filter 22. The breather filter 22 is constructed to capture particles such as dust that may enter the pocket 18. The liquid absorbing member 20 is preferably a desiccant which absorbs any water particles or vapor that may flow through the diffusion tube 18. The diffusion tube 16 is preferably constructed to create a long path between the port 14 and the desiccant pocket 18, so that contaminated air does not reach the pocket 18 with normal ambient pressure changes. In the preferred embodiment, the diffusion tub 18 is approximately 330 millimeters long. The long diffusion path also creates an air capacitor that compensates for variations in the ambient pressure without allowing external air to flow into the pocket 18. For example, if the ambient air has a higher pressure than the air within the cavity, the ambient air will move into the diffusion tube 16. The length of the tub 16 prevents a significant, if any, amount of ambient air from actually entering the pocket 18. The diffusion tube 16 preferably has a large enough diameter, so that air will tend to flow thorough the port than through a secondary opening in the housing of the drive. Thus any air entering the drive unit will be filtered by the desiccant 20 and breather filter 22.

Figure 5:
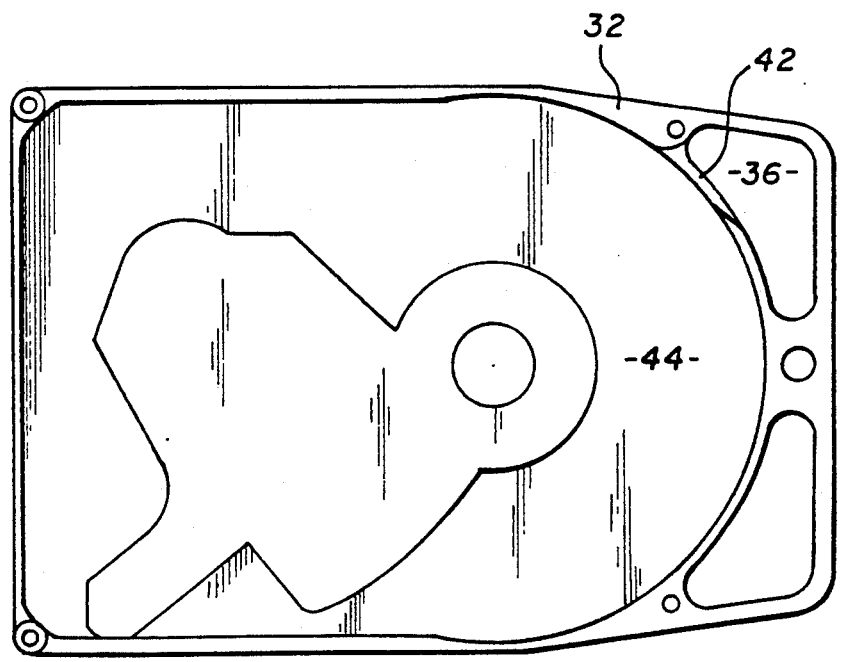
FIG. 5 is a cross-sectional view of a magnetic disk rotating past a venturi portion of the hard disk drive.

The desiccant pocket 18 is coupled to a venturi portion 24 of the baseplate 12 by an internal channel 26 and openings 27. The venturi portion 24 is also connected to a recirculation pocket 28 by channel 30 and openings 31 and 40. As shown in FIG. 3, the recirculation pocket 28 is formed by the baseplate 12 and a cover plate 32. The recirculation pocket 28 contains a recirculation filter 34 which separates an upper recirculation chamber 36 from a lower recirculation chamber 38. The lower recirculation chamber 38 is in fluid communication with the channel 30 and venturi portion 24 through the lower recirculation opening 40. As shown in FIG. 5, the cover plate 32 has a recirculation slot 42 which provides fluid communication between the upper recirculation chamber 36 and an inner cavity 44 of the disk drive.

Figure 4:
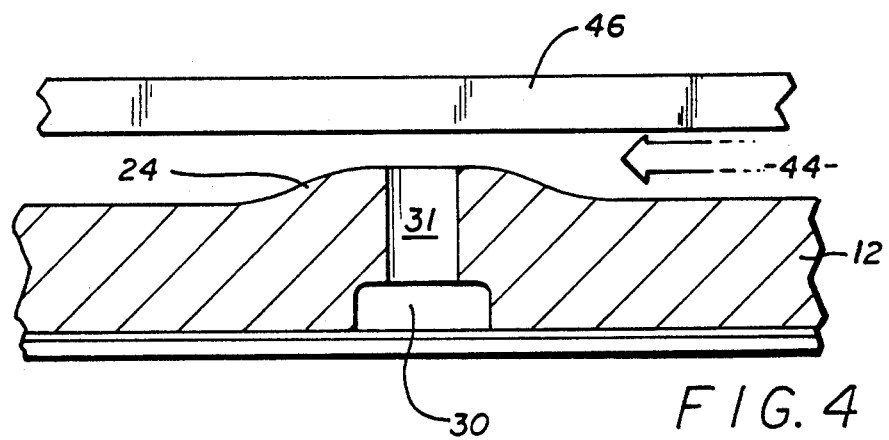
FIG. 4 is a bottom view of a cover plate of the hard disk drive.

As shown in FIG. 4, the venturi portion 24 cooperates with the rotating magnetic disk 46 of the drive, to increase the pressure within the inner cavity 44. The high pressure air within the inner cavity 44 is pushed through the recirculation slot 42 and into the upper recirculation chamber 36 by the rotating disk 46. The venturi 24 also reduces the pressure within the lower recirculation chamber 38. The combination of high pressure in the upper chamber 36 and low pressure within the lower chamber 38 forces the air through the recirculation filter 34. The positive pumping action of the disk and venturi of the present invention creates a pressure differential that can push air through most filters, including filters which typically have a high pressure drop.

The disk and venturi typically create an inner cavity pressure that is higher than the ambient air pressure. Therefore air tends to flow out of any secondary openings rather than flowing into the inner cavity of the disk drive. Secondary openings may be formed by porosities created in the housing material itself, or the interface between the baseplate and the cover plate.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a housing that has a venturi portion within an inner cavity, said venturi portion being in fluid communication with a lower recirculation chamber through a lower recirculation opening, said inner cavity being in fluid communication with an upper recirculation chamber through an upper recirculation slot said housing further having a desiccant chamber in fluid communication with a diffusion tube and said venturi portion of said inner cavity, said diffusion tube being coupled to the ambient by a breather port;

a recirculation filter that separates said upper and lower recirculation chambers;

a fluid absorbing member within said desiccant chamber;

a breather filter within said desiccant chamber; and, a magnetic disk which rotates within said housing, wherein rotation of said magnetic disk past said venturi portion creates a low pressure in said lower recirculation chamber and a high pressure in said upper recirculation pressure such that air within said inner cavity flows across said recirculation filter from said upper recirculation chamber to said lower recirculation chamber.

2. A hard disk drive, comprising:

a housing that is approximately 85 millimeters by 54 millimeters by 10 millimeters, said housing having a venturi portion within an inner cavity, said venturi portion being in fluid communication with a lower recirculation chamber through a lower recirculation opening, said inner cavity being in fluid communication with an upper recirculation chamber through an upper recirculation slot, said housing further having a desiccant chamber in fluid communication with a diffusion tube and said venturi portion of said inner cavity, said diffusion tube being coupled to the ambient by a breather port;

a recirculation filter that separates said upper and lower recirculation chambers;

a fluid absorbing member within said desiccant chamber;

a breather filter within said desiccant chamber; and, a magnetic disk which rotates within said housing, wherein rotation of said magnetic disk past said venturi portion creates a low pressure in said lower recirculation chamber and a high pressure in said upper recirculation chamber such that air within said inner cavity flows across said recirculation filter from said upper recirculation chamber to said bottom recirculation chamber.

3. The hard disk drive as recited in claim 2, wherein said diffusion tube is approximately 330 millimeters long.

* * * * *